Nov. 2, 1948.　　　　F. C. MOSTERTZ　　　　2,452,860
EXTENSOMETER OR STRAIN GAUGE
Filed June 12, 1947　　　　　　　　　　　　2 Sheets-Sheet 1
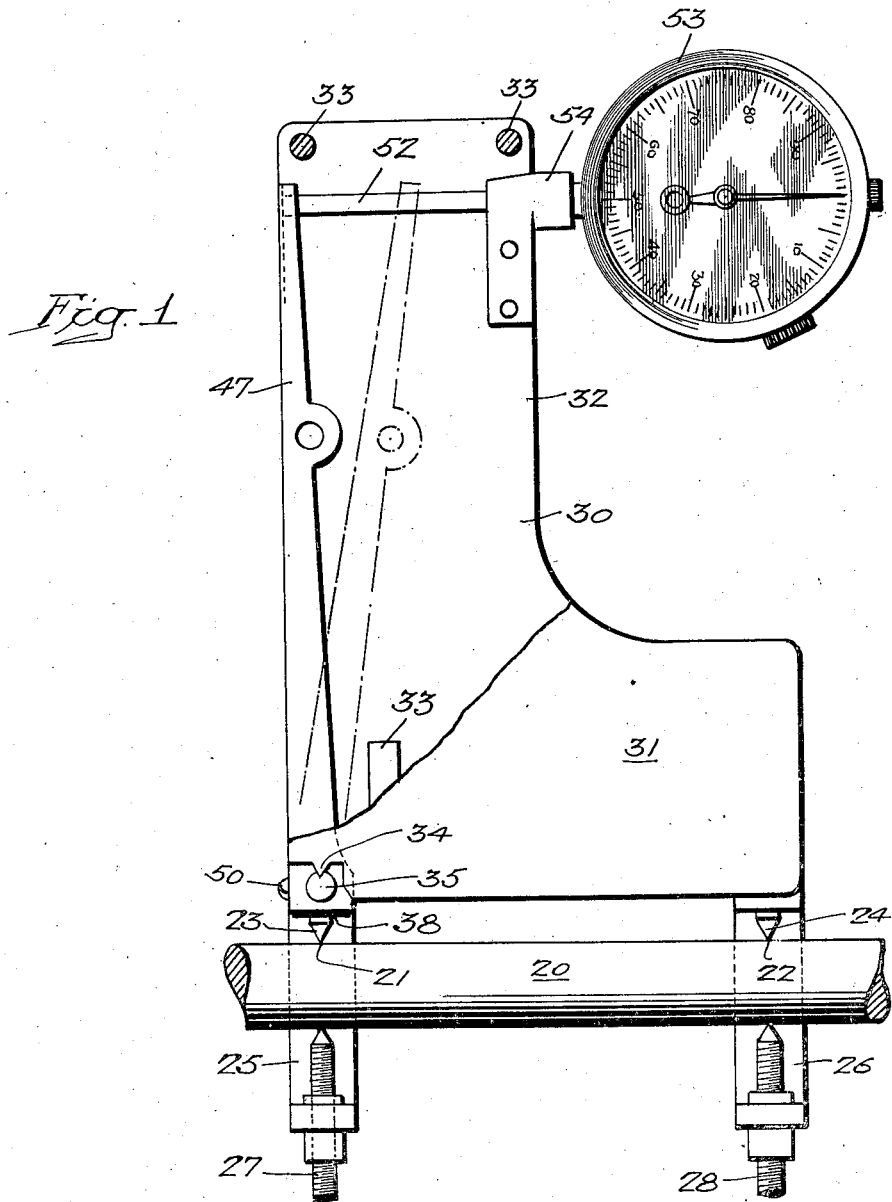
INVENTOR.
Franz C. Mostertz
BY
ATTORNEYS Nov. 2, 1948.  F. C. MOSTERTZ  2,452,860
EXTENSOMETER OR STRAIN GAUGE
Filed June 12, 1947  2 Sheets-Sheet 2
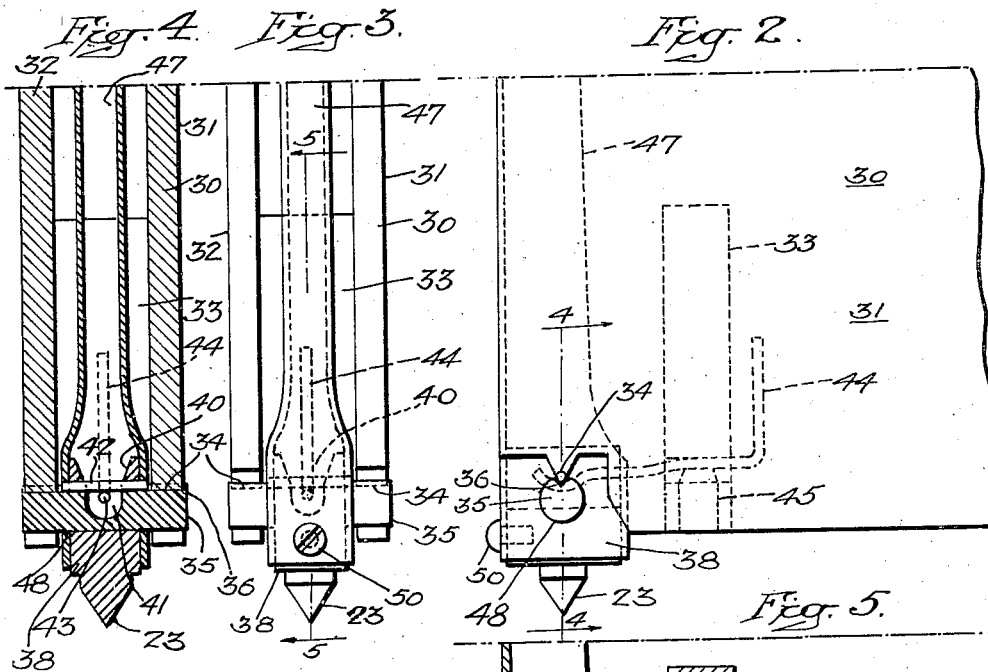
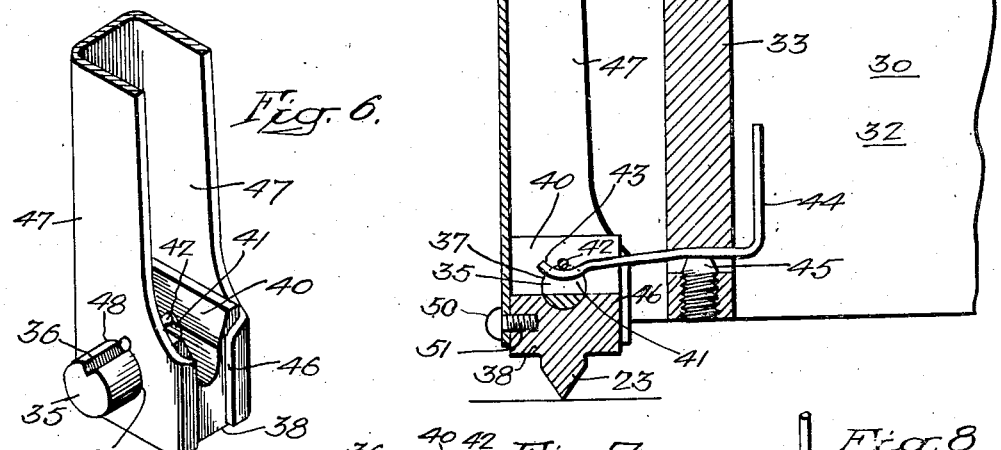
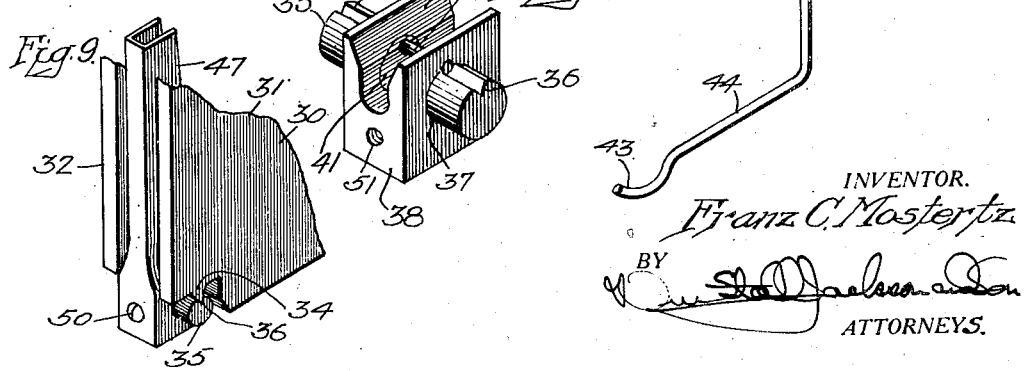
INVENTOR.
Franz C. Mostertz
BY
ATTORNEYS.

Patented Nov. 2, 1948

2,452,860

UNITED STATES PATENT OFFICE 2,452,860

EXTENSOMETER OR STRAIN GAUGE

Franz C. Mostertz, Philadelphia, Pa., assignor to F. F. Metzger and Son, Philadelphia, Pa., a firm Application June 12, 1947, Serial No. 754,177

5 Claims. (Cl. 33—148)

My invention relates to extensometer or strain gauges of the mechanical type.

A purpose of my invention is to simplify the fabrication of the bearing gauge pin and lever assembly of a mechanical extensometer.

A further purpose is to avoid difficulty in replacement of broken parts at the bearing.

A further purpose is to place knife edges on the cheek plates of an extensometer, to place knife edge slots in a desirable circular bearing shaft supported on the knife edges, to mount the bearing shaft intermediate its knife edge slots in a transverse hole of a bearing block, and to surround the bearing block by a lever extension mounted on the bearing block and preferably having openings passing the ends of the bearing shaft.

A further purpose is to mount the gauge pin on the lever block, preferably integral therewith.

A further purpose is to place a spring abutment on the opposite end of the lever block from the gauge pin, preferably in a slot extending across the lever block and the bearing shaft.

Further purposes appear in the specification and in the claims.

In the drawings I have chosen to illustrate only one of the numerous embodiments in which my invention may appear, choosing the form shown from the standpoints of convenience in illustration, satisfactory operation and clear demonstration of the principles involved.

Figure 1 is a partially broken front elevation of an extensometer embodying the present invention.

Figure 2 is a fragmentary enlargement of Figure 1.

Figure 3 is a left end elevation of Figure 2.

Figure 4 is a section of Figure 2 on the line 4—4.

Figure 5 is a section of Figure 3 on the line 5—5.

Figure 6 is a fragmentary perspective of the lever block, lever extension and bearing shaft.

Figure 7 is a detailed perspective of the lever block and bearing shaft from which the lever extension has been removed.

Figure 8 is a perspective of the spring.

Figure 9 is a fragmentary perspective of the bearing assembly.

In the drawings like numerals refer to like parts.

Describing in illustration but not in limitation, and referring to the drawings.

The present invention relates to extensometer or strain gauges of the character employed to measure strain in tensile testing, and also in testing of machines, vehicles, building, bridges and other civil and mechanical engineering structures.

The present invention is a development of Metzger U. S. Patent No. 1,884,073, granted October 25, 1932, for extensometer and is designed to overcome difficulties which have been developed in the construction of the device there shown.

In the Metzger device, a triangular bearing shaft is employed, which is notched to permit the passage of the lever spring and which rides against the retainer. The engaged pin is supported directly on the end of the lever. The fabrication of this character of bearing is quite expensive due to the necessity of machining and inserting the triangular bearing shaft. Due to the notch, the bearing shafts are subject to rather frequent breakage, and replacement is troublesome and expensive in this method of fabrication.

In accordance with the present invention the lever is made up primarily of a lever extension which may be conveniently a stamping, and the gauge pin and bearing shaft are both supported and united to the lever extension by a lever block which is readily removable from the lever extension. The lever block is comparatively simple from a machining standpoint and the bearing shaft is desirably simply a circular shaft which can readily be replaced in case of breakage.

The object 20 on which the extensometer is mounted may conveniently be a tensile test specimen or suitable structural elements having gauge marks 21 and 22. The gauge mark 21 receives the end of a movable gauge pin 23 supported on the extensometer lever to be described, while the gauge mark 22 receives a stationary gauge pin 24 at a suitable spaced difference along the extensometer. The extensometer is held in place by the clamps 25 and 26 having adjusting screws 27 and 28.

The extensometer structure supported by the clamps is mounted upon a housing 30 made up of cheek plates 31 and 32 united by spacers 33. Mounted upon and suitably integral with the cheek plates at a point adjacent to and in line with the gauge pin 23, are located knife edges 34 directed toward the object 20 under test at the gauges mark 21. Cooperating with the knife edges 34 is a preferably circular bearing shaft 35 having knife edge slots 36 on one side near each end of the bearing shaft. The bearing shaft passes through a hole 37 in a lever block 38 and protrudes at each end from the lever block for engagement of the knife edge slots 36 with knife edges 34. The fit between the bearing shaft and the lever block is conveniently made a light drive fit so that in case of breakage of the bearing shaft, which may occur frequently, the broken bearing shaft can readily be driven out and the new bearing shaft readily driven in.

The lever block is preferably integral with and in many cases supports the gauge pin 23.

Lever block on the opposite end from the gauge pin 23 is slotted preferably clear across at 40 transverse to the bearing shaft and the slot is preferably extended at 41 across a portion of the section of the bearing shaft. This feature weakens the bearing shaft and may predispose it to breakage as in the Metzger form, but the bearing shaft is in any case very cheaply made and readily replaceable in the new form. Extending across the slot and supported on the walls of the lever block I provide a spring abutment 42, suitably in the form of a pin, which engages a hook end 43 of a leaf spring 44 suitably mounted by a spring clamp 45 in one of the spacers 33. Suitably surrounding the bearing block, except for the opening 46 through which the spring enters, I provide a lever extension 47, extending in a direction opposite from the gauge pin 23. The lever extension may desirably be a sheet metal stamping. The lever extension has openings at 48 on each side to pass the bearing shaft, and in assembly is placed on the lever block before the bearing shaft is inserted. The lever extension is also held in place on the lever block by a screw 50 in a screw hole 51 of the block.

At the opposite end of the lever extension 47 engagement is made with the operating plunger 52 of a dial micrometer 53 mounted on a bracket 54.

In operation the lever will be assembled by first placing the lever block in the lever extension and is united thereto by the screw 50. The bearing pin will then be driven through holes in the lever extension and the lever block. The lever is then ready for assembly, bringing the knife edge slots against the knife edges and inserting the spring against the spring abutment and clamping the spring clamp.

In case of breakage of the bearing shaft this is readily replaced by taking the lever out of the extensometer, driving the bearing shaft out of the lever extension and lever block and inserting a new bearing block. In case the gauge pin 23 shows wear or is broken, this is readily replaced by removing the lever, taking out the bearing shaft and inserting the new bearing block through removal of the screw 50.

It will be evident by the present invention that it is possible to simplify and cheapen structure of the entire bearing, and particularly of the lever extension.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In an extensometer, cheek plates united together in spaced relation, cooperating knife edges on the cheek plates, a bearing shaft having knife edge slots extending across the knife edges with the knife edges in the slots, a lever block having a transverse opening through which the bearing shaft passes, rigid with respect to the bearing shaft, a gauge pin supported on and rigid with the lever block, a spring abutment on the opposite end of the lever block from the gauge pin, a spring acting on the spring abutment from the cheek plates, and a lever extension secured to the lever block and extending from the opposite end of the lever block from the gauge pin.

2. In an extensometer, cheek plates united together in spaced relation, cooperating knife edges on the cheek plates, a circular bearing shaft having knife edge slots extending across the knife edges with the knife edges in the slots, a lever block between the knife edges having a transverse opening through which the bearing shaft passes, rigid with respect to the bearing shaft, a gauge pin integral with the lever block and transverse to the bearing shaft, walls forming a spring slot transverse of the bearing shaft on the opposite side of the lever block from the gauge pin, a spring abutment in the spring slot, a spring acting on the spring abutment from the cheek plates, and a lever extension removably secured to the lever block and extending from the opposite end of the lever block from the gauge pin.

3. In an extensometer, cheek plates united together in spaced relation, cooperating knife edges on the cheek plates, a circular bearing shaft having knife edge slots extending across the knife edges with the knife edges in the slots, a lever block between the knife edges having a transverse opening through which the bearing shaft passes, rigid with respect to the bearing shaft, a gauge pin integral with the lever block and transverse to the bearing shaft, walls forming a spring slot transverse of the bearing shaft on the opposite side of the lever block from the gauge pin, the spring slot extending across the bearing shaft, a spring abutment in the spring slot, a spring acting on the spring abutment from the cheek plates, and a lever extension removably secured to the lever block and extending from the opposite end of the lever block from the gauge pin.

4. An extensometer lever comprising a bearing shaft having longitudinal knife edge slots on one side near its ends, a lever block having a transverse opening in which the central portion of the bearing shaft is held, a gauge pin extending transversely of the bearing shaft and mounted on the lever block, and a lever extension surrounding the lever block, having openings passing the ends of the bearing shaft, removably secured to the lever block and extending oppositely from the gauge pin.

5. An extensometer lever comprising a bearing shaft having longitudinal knife edge slots on one side near its ends, a lever block having a transverse opening in which the central portion of the bearing shaft is held, a gauge pin extending transversely of the bearing shaft and mounted on the lever block, walls forming a slot across the opposite face of the lever block from the gauge pin and across the bearing shaft, a spring abutment in the slot, and a lever extension surrounding the lever block having openings passing the ends of the bearing shaft, removably secured to the lever block and extending oppositely from the gauge pin.

FRANZ C. MOSTERTZ.

No references cited.